(12) United States Patent
Shepherd et al.

(10) Patent No.: US 9,002,896 B2
(45) Date of Patent: Apr. 7, 2015

(54) KNOWLEDGE-ASSISTED APPROACH TO DYNAMICALLY CREATE DATA SOURCES FOR VARIABLE-DATA MARKETING CAMPAIGNS

(75) Inventors: Michael David Shepherd, Ontario, NY (US); Dale Ellen Gaucas, Penfield, NY (US); Kirk J. Ocke, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 428 days.

(21) Appl. No.: 13/215,470

(22) Filed: Aug. 23, 2011

(65) Prior Publication Data

US 2013/0054651 A1 Feb. 28, 2013

(51) Int. Cl.
*G06F 7/00* (2006.01)
*G06F 17/30* (2006.01)
*G06Q 30/00* (2012.01)
*G06Q 30/02* (2012.01)

(52) U.S. Cl.
CPC ............ *G06Q 30/02* (2013.01); *G06Q 30/0256* (2013.01); *G06Q 30/0207* (2013.01); *G06F 17/30401* (2013.01)

(58) Field of Classification Search
None
See application file for complete search history.

(56) References Cited

U.S. PATENT DOCUMENTS

| | | | | |
|---|---|---|---|---|
| 8,332,405 | B2 * | 12/2012 | Wagenblatt et al. | 707/736 |
| 2010/0125563 | A1 * | 5/2010 | Nair et al. | 707/709 |
| 2011/0295678 | A1 * | 12/2011 | Seldin et al. | 705/14.42 |
| 2011/0314010 | A1 * | 12/2011 | Ganti et al. | 707/728 |
| 2013/0046638 | A1 * | 2/2013 | Shepherd et al. | 705/14.67 |

OTHER PUBLICATIONS

U.S. Appl. No. 12/857,997, filed Aug. 17, 2010 entitled "Semantic Classification of Variable Data Campaign Information."
U.S. Appl. No. 12/858,168, filed Aug. 17, 2010 entitled "Open Class Noun Classification."

* cited by examiner

*Primary Examiner* — James Trujillo
*Assistant Examiner* — Cheryl M Shechtman
(74) *Attorney, Agent, or Firm* — Fay Sharpe LLP

(57) ABSTRACT

A computer-implemented method and system for creating data sources for a variable data publishing (VDP) marketing campaign pattern. The method and system can be utilized to generate a data source from external sources, such as Encyclopedic knowledge-bases, when desired data is not locally available. A user can specify a conceptual identity, and the method and system automatically map the conceptual identity to an appropriate database, generate semantic queries, and query the database to develop the data source for use in the campaign.

20 Claims, 9 Drawing Sheets

FIG. 7

| | |
|---|---|
| dbpedia2:yearSnowCm | 235.7 |
| dbpedia2:decSnowCm | 57.2 |
| dbpedia2:novSnowCm | 21.9 |
| dbpedia2:octSnowCm | 4.1 |
| dbpedia2:sepSnowCm | 0 |
| dbpedia2:augSnowCm | 0 |
| dbpedia2:julSnowCm | 0 |
| dbpedia2:junSnowCm | 0 |
| dbpedia2:maySnowCm | 0.6 |
| dbpedia2:aprSnowCm | 11 |
| dbpedia2:marSnowCm | 39.8 |
| dbpedia2:febSnowCm | 46 |
| dbpedia2:janSnowCm | 55.2 |
| dbpedia:ontology/areaCode | "613, 343 (May 2010)"@en |
| dbpedia:ontology/populationUrbanDensity | 1680.5 |
| dbpedia:ontology/areaTotal | 1072900000 |
| dbpedia:ontology/areaTotal | 2778640000 |
| dbpedia:ontology/leaderName | :Ottawa_City_Council |
| dbpedia:ontology/leaderName | :Larry_O%27Brien_%28Canadian_politician%29 |
| dbpedia:ontology/areaMetro | 5318360000 |
| dbpedia:ontology/populationDensity | 292.3 |
| dbpedia:ontology/elevation | 70 |
| dbpedia:ontology/elevation | 70.104 |
| dbpedia:ontology/postalCode | "K0A, K1A-K4C"@en |
| dbpedia:ontology/areaUrban | 512289999.9999999 |
| dbpedia:ontology/motto | "Advance Ottawa/Ottawa en avant"@en |
| dbpedia:ontology/leaderTitle | "MPs"@en |
| dbpedia:ontology/leaderTitle | "Mayor"@en |
| dbpedia:ontology/leaderTitle | "City Council"@en |
| dbpedia:ontology/leaderTitle | "MPPs"@en |
| dbpedia:ontology/populationTotal | 812129 |
| dbpedia:ontology/populationMetro | 1130761 |
| dbpedia:ontology/populationUrban | 860928 |

FIG. 8

| | A | B | C | D | E | F | G | H | I | J |
|---|---|---|---|---|---|---|---|---|---|---|
| 1 | City | Province | Population | Website | NovSnowCm | DecSnowCm | JanSnowCm | FebSnowCm | MarSnowCm | AprSnowCm |
| 2 | Ottawa | Ontario | 812129 | http://www.ottawa.ca/ | 21.9 | 57.2 | 55.2 | 46 | 39.8 | 11 |
| 3 | Edmonton | Alberta | 1034945 | http://www.edmonton.ca/ | 17.9 | 22.3 | 24.5 | 15.8 | 16.8 | 13.4 |
| 4 | Hamilton | Ontario | 692911 | http://www.hamilton.ca | 7.2 | 30.1 | 35 | 28.1 | 20 | 4.7 |
| 5 | Quebec City | Quebec | 715515 | http://www.ville.quebec.qc.ca/index.aspx | 33.2 | 77.7 | 72.9 | 63.9 | 49 | 17.6 |
| 6 | Regina | Saskatchewan | 206700 | http://www.regina.ca/ | 13.8 | 2.09 | 19.6 | 14.1 | 18.3 | 8 |
| 7 | Saskatoon | Saskatchewan | 233923 | http://www.saskatoon.ca/ | 13.4 | 18.5 | 17.9 | 12.3 | 14.1 | 9.7 |
| 8 | Squamish | British Columbia | 14949 | http://www.district.squamish.bc.ca/ | 21.4 | 69.1 | 71.7 | 47.6 | 22.5 | 2.5 |
| 9 | St. John's | Newfoundland | 181113 | http://www.stjohns.ca/index.jsp | 26.3 | 61.3 | 79.9 | 66.5 | 52.3 | 25.7 |
| 10 | Windsor | Ontario | 323342 | http://www.citywindsor.ca/ | 8.3 | 30.1 | 35 | 27.5 | 20.6 | 4.3 |
| 11 | Winnipeg | Manitoba | 694668 | http://www.winnipeg.ca/interhom/ | 21.4 | 19.8 | 23.1 | 14.2 | 15.8 | 10.1 |

FIG. 9

KNOWLEDGE-ASSISTED APPROACH TO DYNAMICALLY CREATE DATA SOURCES FOR VARIABLE-DATA MARKETING CAMPAIGNS

TECHNICAL FIELD

The presently disclosed embodiments are directed toward methods and systems for generating a marketing campaign. More particularly, the teachings disclosed herein are applicable to methods and apparatuses for generating data sources for use when generating a marketing campaign. It will be appreciated that the described systems and methods may find application in other fields.

BACKGROUND

Data suggests that somewhere between 30-40% of marketing campaigns are personalized, most of which only vary content based on the recipient's name. First-name and last-name are simple textual data values that can be leveraged in a limited capacity on a personalized document (e.g., embedded in textual message or in an image). As CRM (customer relations management) systems become more sophisticated, much more data becomes available in which campaigns can be personalized for customers or prospects. The data (e.g. first-name, last-name, age, gender) and logic (a.k.a "business rules"—e.g. "if gender is male and age is less than 30, then special offer=iPhone otherwise special offer=Blackberry) aspects of a variable data publishing (VDP) plan creation are difficult and time consuming. Marketing Service Providers (MSPs) invest large amounts of time understanding the desires of the campaign customer, testing the specific campaign requirements, and creating the logic necessary to fulfill the campaign intent.

There is a need in the art for systems and methods that facilitate identifying the intent of a user designing a marketing campaign while overcoming the aforementioned deficiencies.

BRIEF DESCRIPTION

In one aspect, a computer-implemented method for creating data sources for a variable data publishing (VDP) marketing campaign pattern comprises receiving user input related to a conceptual entity specified by the user, determining a type of the conceptual entity, mapping the conceptual entity to at least one encyclopedic knowledge database based on the type of the conceptual entity, generating at least one semantic query based on the conceptual entity, querying the encyclopedic knowledge database with the at least one semantic query, and generating a data source for use in a VDP marketing campaign containing values derived from the querying step.

The receiving user input related to a conceptual entity can include presenting the user with a plurality of conceptual entities, and receiving an indication from the user regarding a selected conceptual entity. The method can further comprise presenting the user with at least one VDP element comprising a natural language sentence having a plurality of selectable conceptual entities, receiving an indication that the user has selected at least one of the conceptual entities, and/or presenting the data source to the user for selection of at least attribute-value pair for use in the VDP campaign. The data source can include at least one of product information, geographical information, climate information, or business information. The method can also include storing at least one semantic query in a memory, and/or querying the encyclopedic knowledge database with at least one semantic query stored in memory on a periodic basis to update the data source. The method can include generating a VDP marketing campaign using at least some information contained in the data source. A processor can be configured to execute computer-executable instructions for performing the method, the instructions being stored on a computer-readable medium.

In accordance with another aspect, a system that generates data sources for a variable data publishing (VDP) marketing campaign pattern comprises a graphical user interface (GUI) via which a user interacts with a campaign creation application that is persistently stored on a computer-readable medium, and a processor that executes the campaign creation application. The processor is configured to receive user input related to a conceptual entity specified by the user, determine a type of the conceptual entity, map the conceptual entity to at least one encyclopedic knowledge database based on the type of the conceptual entity, generate at least one semantic query based on the conceptual entity, query the encyclopedic knowledge database with the at least one semantic query, and generate a data source for use in a VDP marketing campaign containing values derived from the querying step.

Receiving user input related to a conceptual entity can include presenting the user with a plurality of conceptual entities, and receiving an indication from the user regarding a selected conceptual entity. The processor can be further configured to present the user with at least one VDP element comprising a natural language sentence having a plurality of selectable conceptual entities, receive an indication that the user has selected at least one of the conceptual entities, and/or present the data source to the user for selection of at least attribute-value pair for use in the VDP campaign. The data source can include at least one of product information, geographical information, climate information, or business information. The processor can also be configured to store the at least one semantic query in a memory, and/or, configured to query the encyclopedic knowledge database with the at least one semantic query stored in memory on a periodic basis to update the data source. The processor can further be configured to generate a VDP marketing campaign using at least some information contained in the data source.

In accordance with another aspect, a computer-readable medium having persistently stored thereon computer-executable instructions for personalizing a variable data publishing (VDP) marketing campaign pattern, comprises instructions for receiving user input related to a conceptual entity specified by the user, determining a type of the conceptual entity, mapping the conceptual entity to at least one encyclopedic knowledge database based on the type of the conceptual entity, generating at least one semantic query based on the conceptual entity, querying the encyclopedic knowledge database with the at least one semantic query, and generating a data source for use in a VDP marketing campaign containing values derived from the querying step.

BRIEF DESCRIPTION OF THE DRAWINGS

The file of this patent contains at least one drawing executed in color. Copies of this patent with color drawing(s) will be provided by the U.S. Patent and Trademark Office upon request and payment of the necessary fee.

FIG. 7 illustrates a screenshot showing the results of a query to an encyclopedic knowledge-base (EKB) in accordance an example of the disclosure and with one or more aspects described herein.

FIG. 8 illustrates a screenshot showing the results of a query to another EKB in accordance another example of the disclosure and with one or more aspects described herein.

FIG. 9 illustrates a screenshot showing the resulting data source created from the query example shown in FIG. 8.

DETAILED DESCRIPTION

The above-described problem is solved by providing a knowledge-assisted method in which a VDP (variable data printing/publishing) non-expert can express his or her desired VDP logic for a VDP campaign. The technique is supported by a knowledge-base (e.g., a database+entity logic) of common types of VDP campaigns. Through the semantic expression of VDP elements and logic, the MSP can more easily and accurately convey the desired campaign intent to the team members collaborating on the campaign. Additionally, the MSP can more accurately align the execution of the campaign as expected by the client, as the patterns provide a more natural nomenclature for expressing campaign intent. Expression of campaign intent can automatically be reified into an executable campaign plan and corresponding data schema.

Highly personalized marketing can be significantly more successful by making the most effective use of customer data for creating an exceptional personalized experience, whether acquiring new customers or retaining and up-selling existing customers. The potential complexity of personalization grows with the amount of data resources accessible by the MSP. Thereby the logic involved in driving a personalized campaign can become very complicated. Larger available data sources cause complexity to grow in two directions: first, the implicit knowledge that can be derived from the explicit data in the data source; and second, the number and quality of decisions needed to be made based on the implicit and explicit data in order to create the highly personalized document.

As CRM systems become more sophisticated, they will not only incorporate more customer static and historical data, but will also be able to learn much more about a customer or prospect via web queries, real-time data, and interaction with online social media, as well as targeting via psychographics. As more customer data, both explicit and implicit, becomes available, there will emerge a need to express the logic of a marketing campaign using more robust automated knowledge techniques. As a result, many campaigns may be prone to either ignoring marketing opportunities hidden in the data due to the complexity of mining the data (resulting in less-effective campaigns) or requiring highly skilled database programming experts (resulting in high campaign costs). The subject innovation provides systems and methods that facilitate meeting the above-described needs in order to take advantage of more complex data and to improve marketing campaign personalization.

Figure 1:
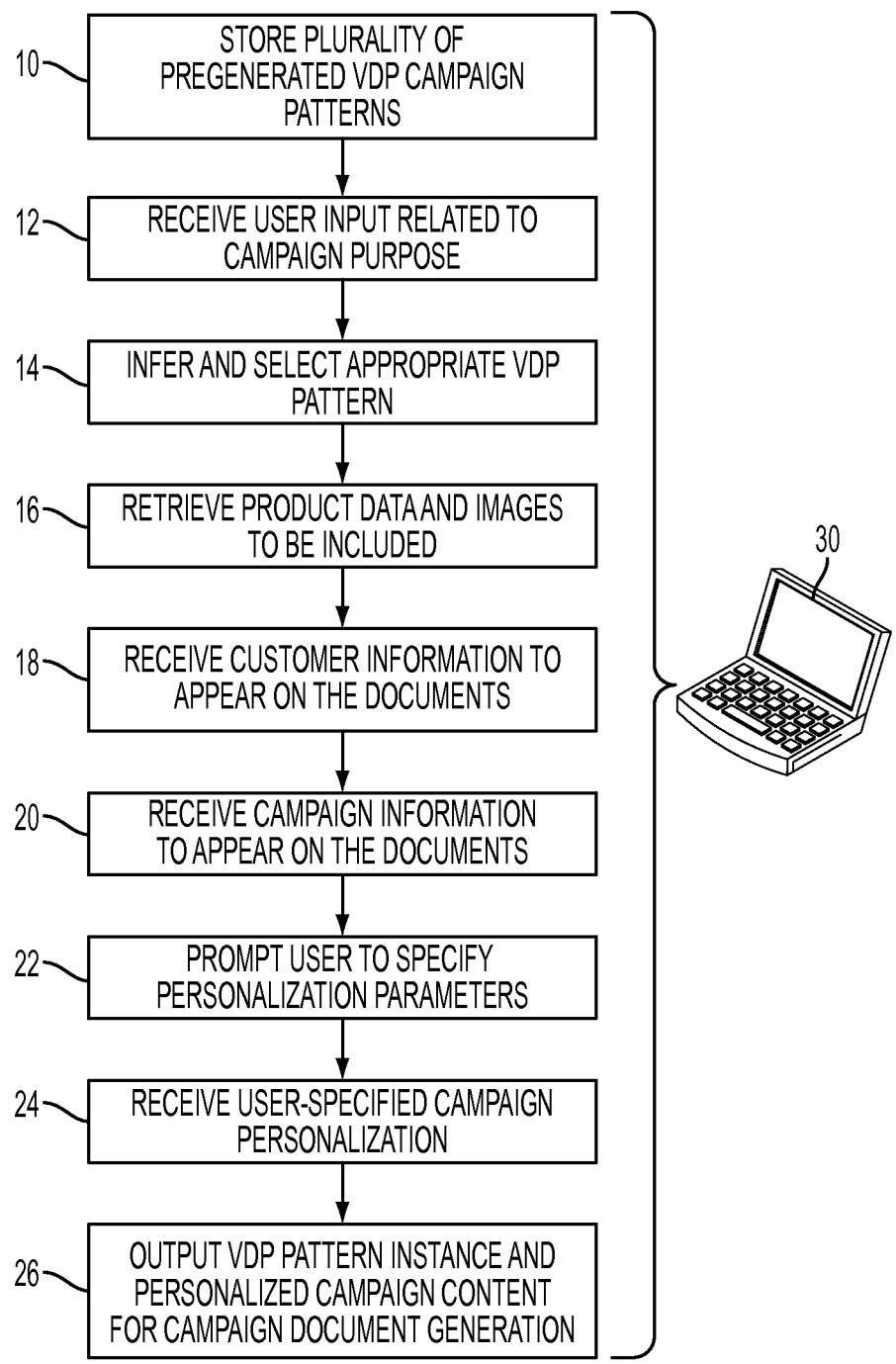
FIG. 1 illustrates a method for identifying campaign designer intent in which a VDP non-expert user can express the desired VDP logic for a personalized marketing campaign.

FIG. 1 illustrates a method for identifying campaign designer intent in which a VDP non-expert user, also referred to herein as a "campaign designer," can express the desired VDP logic for a personalized marketing campaign. Accordingly, at 10, a plurality of pre-generated campaign patterns are stored (e.g., in a memory, computer-readable medium, etc.). These campaign patterns are hereafter referred to as "VDP Patterns." Types of VDP Patterns include, without being limited to, Product Offer, Advertisement, Solicitation, Invitation, Announcement, Recall, Reminder, Survey, Greeting Card, Itinerary, etc. Additionally, each VDP Pattern is semantically defined and represented to contain VDP elements specific to that VDP Pattern. "VDP elements" denote high-level concepts that are typically populated by variable content. At 12, user input is received, which describes a campaign purpose (e.g., a sale, incentive, service, etc.). At 14, an appropriate VDP pattern is inferred based on the user's indicated campaign purpose and selected for populating with user-provided recipient-specific information. At 16, existing data and images to be used in the VDP pattern are received. The existing data and images can be entered (e.g., downloaded) by the campaign designer and/or can be selected from a database of stored images and/or data.

At 18, customer information to appear on the campaign documents is received. For instance, the designer can download or import customer data from a source, such as a spreadsheet or the like. At 20, campaign information to appear in the document(s) is received. Campaign information may include, for instance, a coupon or reward, a sale data and location, or any other information the designer wishes to disseminate to one or more customers. At 22, the user is prompted to specify personalization parameters for the campaign. User prompts are a function of the selected VDP pattern, which in turn has been selected as a function of the user's specified campaign intent. At 24, user-specified campaign personalization is performed. For instance, a user may wish to personalize the VDP pattern to include variable data such as name, nearest store to the named customer, and coupon size (e.g., which may be a function of an amount the named customer spent at the store in a previous time period or the like). At 26, the personalized VDP pattern and campaign content are output (e.g., on a graphical user interface, via a print-out, via email, or some other suitable means) for review and verification and for generating the campaign documents (e.g., personalized emails, post cards, mailers, web-based advertisements, etc.).

It will be appreciated that the method of FIG. 1 can be implemented by a computer 30, which comprises a processor (such as the processor 202 of FIG. 4) that executes, and a memory (such as the memory 204 of FIG. 4) that stores, computer-executable instructions for providing the various functions, etc., described herein.

The computer 30 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 30 can include a processing unit (see, e.g., FIG. 4), a system memory (see, e.g., FIG. 4), and a system bus (not shown) that couples various system components including the system memory to the processing unit. The processing unit can be any of various commercially available processors. Dual microprocessors and other multi-processor architectures also can be used as the processing unit.

The computer 30 typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A user may enter commands and information into the computer through an input device (not shown) such as a keyboard, a pointing device, such as a mouse, stylus, voice input, or graphical tablet. The computer 30 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

Figure 2:
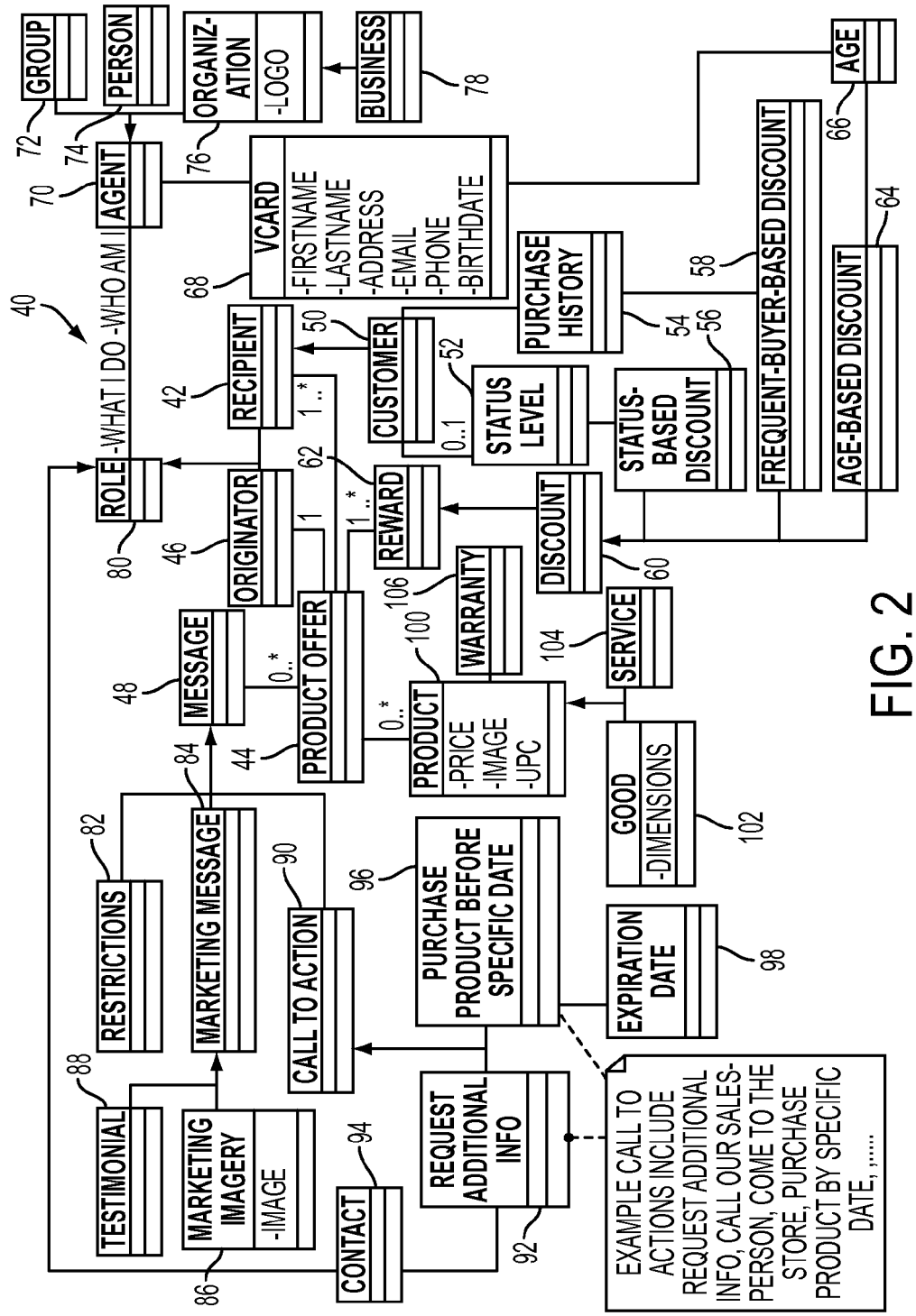
FIG. 2 shows an example VDP Pattern called "Product Offer."

FIG. 2 shows an example VDP Pattern 40 called "Product Offer." The surrounding boxes are the supporting VDP elements. "Element" as used herein denotes both a computer-readable medium or portion thereof that stores information, as well as a populatable and personalizable field into which the information may be entered by a user. For instance, a user may enter information into a given field presented to the user on a graphical user interface, and/or the information may be downloaded or extracted from an electronic document or source and automatically entered into appropriate fields. Once entered, the information is then stored at a predefined location in a system memory. Although the herein-described knowledge-base has in-depth knowledge of the relationships between elements, the system and method defined herein uses the VDP concepts most directly related to the specific VDP Pattern for illustrative purposes. Some VDP elements are shared across many VDP Patterns. For instance, every VDP Pattern, by the definition of VDP campaign, has a recipient element 42. As another example, Offers, Recalls, and Warranty Extensions typically all share the Product element 44. Different campaigns can use different VDP elements of the VDP Patterns. In one embodiment, some elements may be mandatory while others may be optional.

The VDP pattern 40 also includes an originator element 46 that originates the offer or marketing campaign, as well as a message element 48 that includes a message for the recipient. The recipient may be a customer of the campaign designer (e.g., a merchant), and therefore the pattern 40 includes a customer element 50. Each customer has a status level 52 and a purchase history 54, which can be analyzed to generate a status-based discount 56 and/or a frequent-buy-based discount 58. Information from the status-based discount element 56 and/or the frequent-buyer-based discount element 58 is provided to a discount element 60, which in turn provides information to a reward element 62 that generates a reward for inclusion in the product offer 44. An age-based discount element 64 can provide age-based discount information to the discount element 60. A customer's age 66 is stored or determined by an age element 66, such as by analyzing or storing a vcard 68 or the like.

The VDP pattern 40 also includes elements associated with an agent who can help the campaign designer design the marketing campaign. For instance, an agent element 70 comprises information regarding the identity of the agent, which may be collected from a group element 72 that identifies multiple agents, from a person element 74 that identifies a single agent, and/or from an organization element 76 that identifies an organization that acts as an agent. A business element 78 includes information related to the business of the organization acting as an agent. The agent element has is populated with a desired level of information describing the identity of the agent, and is associated with a role element 80 that includes information related to one of more functions or services provided by the agent.

The message element 48 can include one or more message types such as one or more restrictions on the product offer, which are stored in a restrictions element 82. The message may also include a marketing message that is stored in a marketing message element 84. The marketing message may include marketing imagery obtained from a marketing imagery element 86 that stores images, as well as testimonial information (i.e., testimonials for satisfied customers or the like) that are stored in a testimonial element 88. Additionally, the message 48 can include one or more calls to action that are stored in a call to action element 90. In one example, the call to action includes a request for additional information 92, in which case a contact element 94 is executed to contact either the recipient of the product offer or an agent (e.g., via the role element 80) who then contacts the recipient. In another example, the call to action includes an offer deadline, e.g., stored in a "purchase product before specific date" element 96. The deadline information for a given product offer is stored in an expiration date element 98.

The product offer 44 may also include product information, which is stored in a product element 100, and which may include, without limitation, one or more of product price, an image of the product, UPC information for the product, etc. A good element 102 includes product information for one or more goods, such as dimension and the like, while a service element 104 includes information related to a service that is to be offered. A warranty element 106 includes information related to product warranty, which can be included in the product offer 44.

Figure 3:
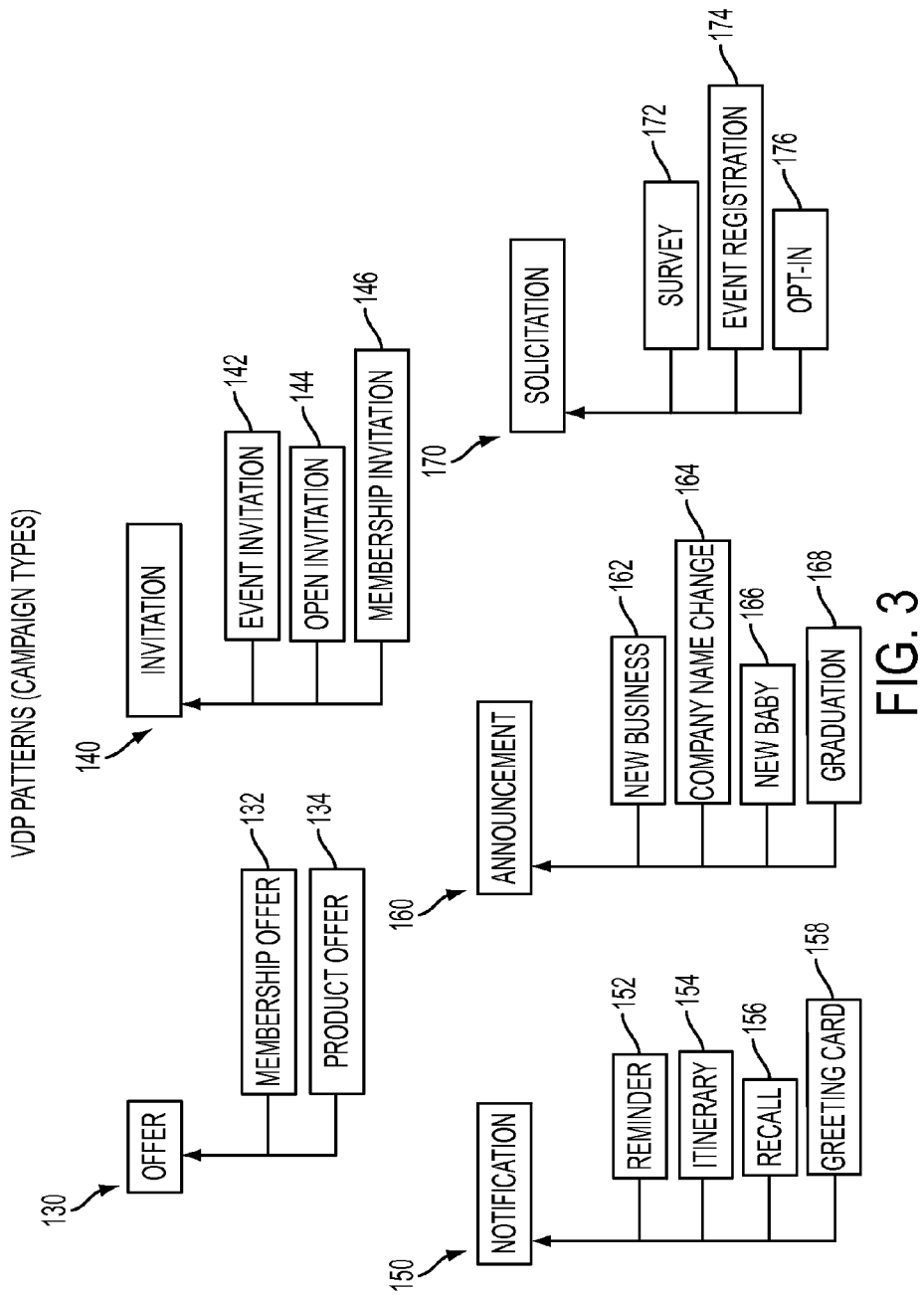
FIG. 3 illustrates a plurality of examples of VDP patterns, such as may be employed in conjunction with various aspects described herein.

FIG. 3 illustrates a plurality of examples of VDP patterns, such as may be employed in conjunction with various aspects described herein. An offer VDP pattern 130 can include, for example, a membership offer 132 and/or a product offer 134. An invitation VDP pattern 140 can include, for example, an event invitation 142, an open invitation 144, and/or a membership invitation 146. A notification VDP pattern 150 may include, for example, a reminder 152, an itinerary 154, a product recall 156, and/or a greeting card 158. An announcement VDP pattern 160 can include, for example, a new business announcement 162, a company name change announcement 164, a new baby announcement 166, and/or a graduation announcement 168. A solicitation VDP pattern 170 can include, for example, a survey 172, an event registration form 174, and/or an opt-in form 176.

Figure 4:
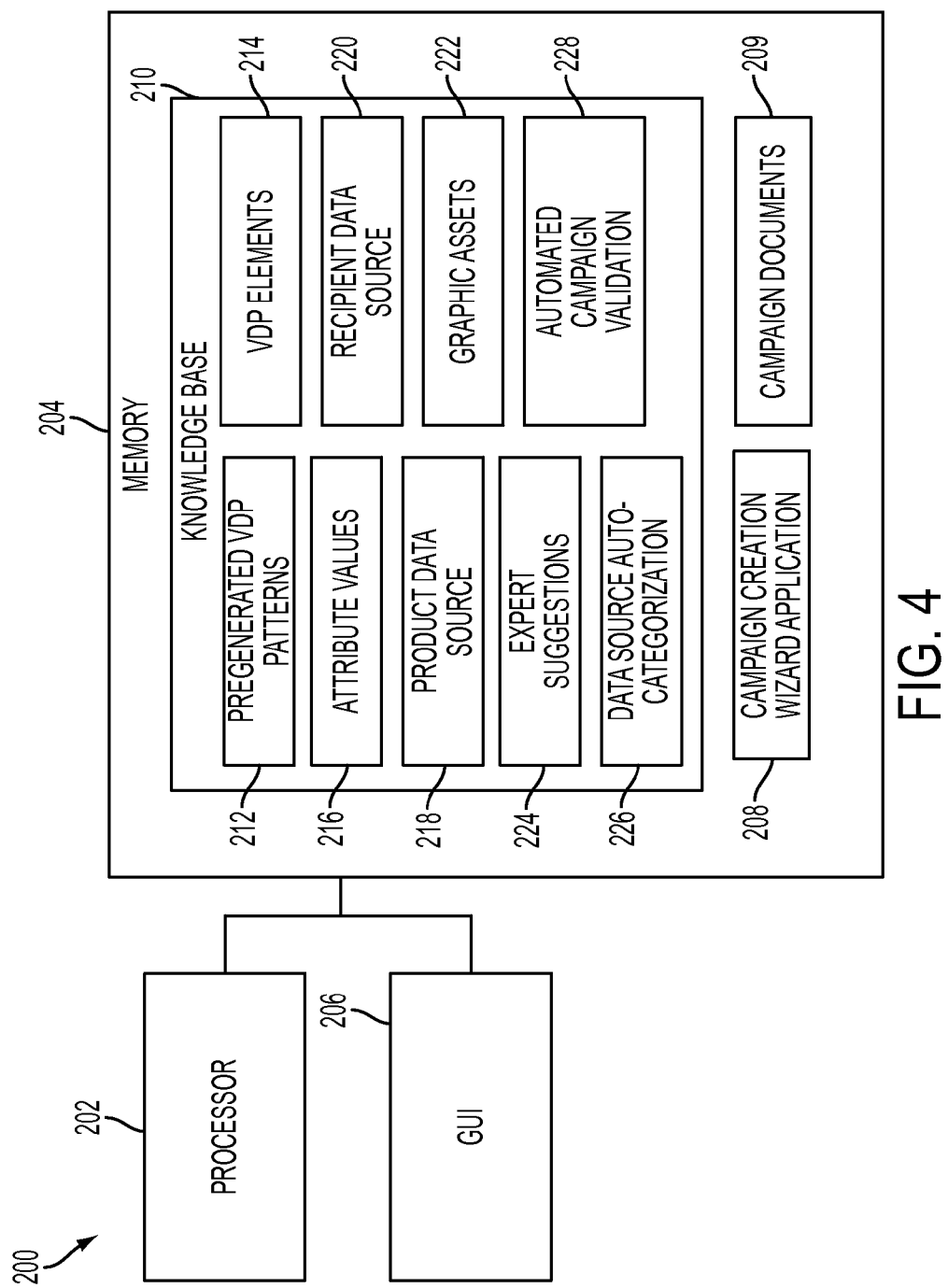
FIG. 4 illustrates a system that facilitates identifying user intent when generating a marketing campaign in order to infer an appropriate VDP pattern and populate the pattern with personalized information, in accordance with one or more aspects described herein.

FIG. 4 illustrates a system 200 that facilitates identifying user intent when generating a marketing campaign in order to infer an appropriate VDP pattern and populate the pattern with personalized information, in accordance with one or more aspects described herein. The system comprises a processor 202 that executes, and a memory 204 that stores computer-executable instructions for performing the various functions, methods, techniques, steps, and the like described herein. The processor 202 and memory 204 may be integral to each other or remote but operably coupled to each other. In another embodiment, the processor and memory reside in a computer (e.g., the computer 30 of FIG. 1). The system further comprises a GUI 206 via which information is presented to the non-expert user (i.e., a layman marketing campaign designer, such as a store or small business owner or the like), and via which the user enters information to the system. The GUI 206 may also be integral to the computer 30.

The memory persistently stores data and computer-executable instructions for performing the described functions, methods, techniques, and the like. For instance, the memory 208 stores a campaign creation wizard module that is executed by the processor to receive information from the user, analyze received information, and output the business logic for a marketing campaign for to the user. In this manner, the wizard module 208 walks the non-expert user through the campaign design process in order to generate the business logic for the marketing campaign that targets the user's customers with personalized campaign documents 209 (e.g., post cards, mailers, emails, web-based ads, or any other suitable campaign media.

As stated above, the system 200 comprises the processor 202 that executes, and the memory 204 that stores one or more computer-executable modules (e.g., programs, computer-executable instructions, etc.) for performing the various functions, methods, procedures, etc., described herein. Additionally, "module," as used herein, denotes a set of computer-executable instructions, software code, program, routine, or other computer-executable means for performing the described function, or the like, as will be understood by those of skill in the art. Additionally, or alternatively, one or more of the functions described with regard to the modules herein may be performed manually.

The memory may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

A knowledge-base 210 (i.e., a computer-readable medium) of VDP patterns 212 is pre-constructed, e.g., by a knowledge engineer, and provided to such a system. The VDP patterns are represented using the vocabulary of the non-expert. Additionally, given a starting knowledge-base, the VDP patterns are also amenable to extension by the campaign designer (non-expert), graphic artist, VDP logic developer, or other campaign developer.

The systems and methods described herein are supported by the wizard module 208, which can accept the campaign designer's desired campaign intent and automatically express and store the campaign intent as one or more instances of VDP patterns 212 and VDP elements 214 (see, e.g., FIGS. 2 and 3). The described systems and methods use an underlying infrastructure to transform the provided instances into initial VDP plan logic that can be used by the logic developer to create the final VDP plan logic. The plan logic incorporates the rules, data schema, and content objects exported to the design. This arrangement also provides the logic developer and/or data specialist with a skeleton of the information expected to be available in the data, and as such can "flag" early on data inconsistencies or shortcomings. Sufficiently simple campaign plan logic could be used to compose the campaign documents without need for a logic developer.

The campaign designer first expresses (e.g., via the GUI 206) the type of VDP campaign they would like to create. This can occur in various ways. For instance, one approach is that all VDP patterns 212 stored in the knowledge-base 210 are presented to the campaign designer for them to choose from. To help select and instantiate a VDP pattern, the campaign designer may be presented with one or more examples in the form of a natural language (NL) sentence. The scope of the natural language used in this embodiment corresponds to the vocabulary of the VDP patterns, which represents the knowledge of the non-expert. Sentence examples may include, without limitation:

I want to send out a promotion to my new health club service.
I want to send out a recall notice for a specific tire model.
I want to send out notifications that a car warranty is expiring.
I want to send out (event) invitations to my family for a 50th wedding anniversary.
I want to up-sell my top customers by offering a variable discount on a new TV on their birthday.
I want to send out an announcement that my business is moving to a new location.
I want to send an (open) invitation for people to join my stamp collecting club.
I want to send out an advertisement to my customers announcing that we carry new finishing butters.
I want to send out customer satisfaction surveys to recent car repair clients.
I want to send personalized holiday greeting cards to all of my friends.

Each VDP pattern 212 is supported by a natural language description that consists of all high-level VDP elements 214 associated with that VDP pattern. The associated VDP elements are "parameterizable" pieces of the NL description. Some examples include:

Product Offer:
For each recipient, my Product Offer will promote <Product> by offering <Reward> if the recipient takes <Call To Action>, with possible <Restrictions>.
Announcement:
For each customer, my Announcement will convey new <Information> with the <Benefit> to the customer with a possible <Call To Action>

Event Invitation:

My Event Invitation will invite each invitee to <Event> at designated <Venue> at a particular <Time> with a desired <Call To Action>, with possible <Restrictions>.

Each VDP element parameter (shown above in brackets < >) is provided as a semantic placeholder for the user to define VDP content. The campaign designer selects the VDP element from the sentence and may then enter any number of options to use as VDP content. For example, a pet store campaign designer selects the <Product> concept and inputs to the system the following product descriptions:

Iams Hairball-Control Cat Food
Flexi Retractable Dog Leash
Habitrail Hamster Habitat
BioCube Aquarium Each product description is automatically created as a product instance in the knowledge-base of VDP patterns. In cases where multiple values are entered, it is inferred that the VDP element "Product" is variable content, and that a rule is desirable to determine which specific product description to use for each recipient. The campaign designer is then requested to enter the semantics of the data source that will determine the variable content of product for a particular recipient. To further the present example, the campaign designer specifies "pet preference" and assigns data values "cat," "dog," "hamster," and "fish," respectively. The "Product" VDP element in this case is denoted as "variable" in the knowledge base and each instance of the Product is tagged with the data value that is used to select it as variable content.

The data value may be implicit or explicit, and may come from any number of sources. Examples of data value extraction sources include, without limitation: the value may come from a database expert who mines customer purchase history to determine "pet preference"; from a specific pre-existing data field available in a data source; or from automated techniques for determining available data implicit in a given data source.

Continuing the example, the campaign designer selects the <Reward> concept and is offered choices for the type of Reward such as a Frequent-Buyer-Based Discount. The designer may then choose to vary such a discount based on the amount of purchases (e.g., number of purchases, total amount spent on all purchases, etc.) for the past predetermined period (e.g., 12-months). Variable rewards are specified of e.g. "30%", "20%", and "10%" and are offered to customers who have specified "spend level" of values e.g. "over $1000", "between $500 and $1000", and "less than $500" respectively. The Reward VDP element of Product Offer in the knowledge base is then denoted as "variable" and instantiated with these values, as was done for the Product VDP element above.

In a related example, the campaign designer wants the Call To Action element to be the same for all customers. The designer selects the <Call To Action> concept and enters a single value of "Redeem this offer at our store before June 30$^{th}$." The Call To Action VDP element in the knowledge base is set to "static" and instantiated with a single value. It will be appreciated that any VDP Pattern can be extended to include additional Promotional Messages, whether they are text or images. One option that the campaign designer may select is to include variable or static Promotional Messages in the VDP document. Continuing with the above pet store example, the campaign designer may provide various sets of graphic assets that they will use to provide an attractive marketing "feel" or aesthetic quality to the campaign document.

In some instances, the designer may desire to reuse the "pet preference" semantic data in which he desires to use imagery from a "cat" graphic asset folder or database when the pet preference is "cat", a "dog" graphic asset folder when the pet preference is "dog," etc. The graphic assets can also be pulled from a content management system that is connected to the wizard application. The designer can also specify variable text messages that include testimonials from cat-owners for the "cat" pet preference, testimonials from dog-owners for the "dog" pet preference, etc.

Once the knowledge base is populated with all desired instances that represent the campaign for a particular VDP pattern, the full instantiation of the campaign is then transformed into a partially-populated or, in some cases, a fully-executable, VDP plan. The transformation automatically creates all the content objects, the logic for determining the variable content, and the data schema needed to support the campaign plan, as well as stores the graphic asset files so they are accessible by the VDP environment. In a specific example in which Xerox's XMPie™ suite is employed, this feature creates an XMPie plan file for the uPlan™ logic definition application.

The VDP elements in the knowledge base may also contain various attributes 216 specific to a given element. For instance, a Product element may have single- and multi-valued attributes such as "price," "image," universal product code or "UPC," etc. In one embodiment, a means for the campaign designer to specify values for the attributes of a VDP element is provided. The attribute values for the element are then made available as content when the corresponding VDP element is selected for a particular dynamic document. In one embodiment, the campaign designer downloads or otherwise generates a product data source 218 (e.g., a list, spreadsheet, or other data source comprising information relating to the products to be included on the campaign documents).

For instance, as the campaign designer is inputting the <Products> for the pet store campaign, he can specify a price and an image of each Product that is to appear on the marketing documents. In one example, upon entering the Product description, the campaign designer indicates a price and image that the product (e.g., a hamster habitat) will have, as associated attribute values. When providing associated values, known values are encoded directly into the knowledge base associated with the <Product> instance. Additionally or alternatively, an attribute value lookup is performed to identify the associated attribute value(s). In another embodiment, the associated value is initially left blank for later value assignment. A VDP element's attributes list may be obtained through various means with the GUI. Entries are made in the knowledge base that capture the campaign intent that the selected attributes represent variable content, as well as whether the selected attributes are graphics or text.

Continuing with the example, the campaign designer specifies known <Product> attribute values using the methods described herein. Table 1 shows examples of product attribute values 216, such as can be extracted from the product data source 218 by the processor 202 when executing the wizard 208, and/or entered directly by the campaign designer.

TABLE 1

| Product | Price | Image | UPC |
|---|---|---|---|
| Hairball Control Food | $30 | Image1.jpeg | 019014230079 |
| Retractable Dog Leash | $20 | Image2.TIFF | 047181025019 |
| Hamster Habitat | $25 | Image3.GIF | 080605626003 |
| Aquarium | $80 | Image4.PNG | 797926820514 |

The wizard 208 employs campaign intent that may include references to images. It will be appreciated by those of skill that any suitable image type or format may be employed by the subject systems and methods. While Table 1 illustrates four image file formats (jpeg, TIFF, GIF, and PNG), it will be understood that the herein-described systems are not limited thereto.

If the campaign designer desires the recipient's first name to appear on the dynamic document, then the designer indicates that they want the 'firstName' of the recipient to be variable and designate the assignment be to set up by a data specialist. The data specialist and/or logic developer then use this designer-specified campaign intent knowledge to modify the automatically created plan file to extract the appropriate value for the recipient's first name out of a recipient data source 220, which may be provided by the designer (e.g., a spreadsheet comprising a list of the designer's customers or a subset thereof, a database, a comma-delimited list of customers, etc.).

The knowledge base 210 also includes graphic assets 222 (e.g., images, icons, logos, etc.), that the user can select to personalize the campaign documents. Additionally, the expert suggestions 224 are stored in the knowledge base and can be retrieved and presented to the user when the wizard determines that the user's VDP pattern can benefit from automatic suggestions of meaningful actions for the user to take. Additionally, the knowledge base 210 includes a data source auto-categorization module 226 that automatically determines the semantic categories of the data values (e.g., first name, last name, zip code, spend level, pet type, etc.) in each column or row of a downloaded data source. An example of a data source auto-categorization technique that may be employed in conjunction with various aspects described herein is found in U.S. patent application Ser. No. 12/857,997, filed on Aug. 17, 2010 and entitled "Semantic Classification of Variable Data Campaign Information," which is hereby incorporated by reference herein in its entirety. An automated campaign validation module 228 continuously or periodically checks the campaign pattern during the design states for errors. If an error is detected, the wizard application prompts the user to correct the errors and walk the user through the corrective actions.

As will be appreciated, personalized campaigns are accomplished through the use of dynamic documents, each of which contains content that is specific and relevant to a particular recipient. The data that drives the dynamic content not only can originate from a recipient data source which contains information about all potential recipients of the campaign, but also from auxiliary non-recipient data sources that contain information not specific to the individual recipients. Examples of non-recipient data sources include data sources describing products, cities, countries, organizations, venues, events, vehicles, etc.

Campaign designers will formulate requirements for variable-data marketing campaigns that include the particular categories of data which they desire to use as the dynamic content in the VDP campaign. These categories of data can include both recipient data and, as noted, non-recipient data. Often times the campaign designer will desire to render information on the dynamic document that is not readily accessible via a data source they have on hand, or their data source may be missing the desired information. In such cases, the system 200 and/or wizard 208 can be configured to access information from other sources to facilitate the creation of a desired data source for a VDP campaign.

One potential source of information are Encyclopedic Knowledge-Bases (EKB). EKBs semantically capture a wide expanse of knowledge through the use of Linked Data and ontological representations. Semantic mark-up of sites such as Wikipedia provide specific references to content which can be linked together into a Resource Description Framework (RDF) Data Model to provide a web of Linked Data. Additionally, ontologies provide a structured knowledge framework to semantically convey certain meanings on the relationships in the Linked Data. These ontologies include DBpedia (RDF of Wikipedia), GoodRelations (RDF of commercial details of Business Offering), eClassOWL (RDF of type and features of products or services), Consumer Electronics Ontology, FOAF (RDF of social networks), etc.

Queries about particular entities can be posed to EKBs which return a vast set of information about the entity's types, properties, and relationships with other entities. This can be accomplished through the use of an RDF query language called SPARQL, for example.

As described above, the campaign designer may desire to render non-recipient data on the VDP campaign's dynamic documents. The campaign designer expresses a requirement (or campaign intent) to select data about a particular entity. This can be done in the context of a campaign brief, via a new VDP Pattern Element as described in commonly assigned U.S. patent application Ser. No. 13/211,437 filed on Aug. 17, 2011, which is hereby incorporated by reference in its entirety, or through discussion with a VDP data expert.

Figure 6:
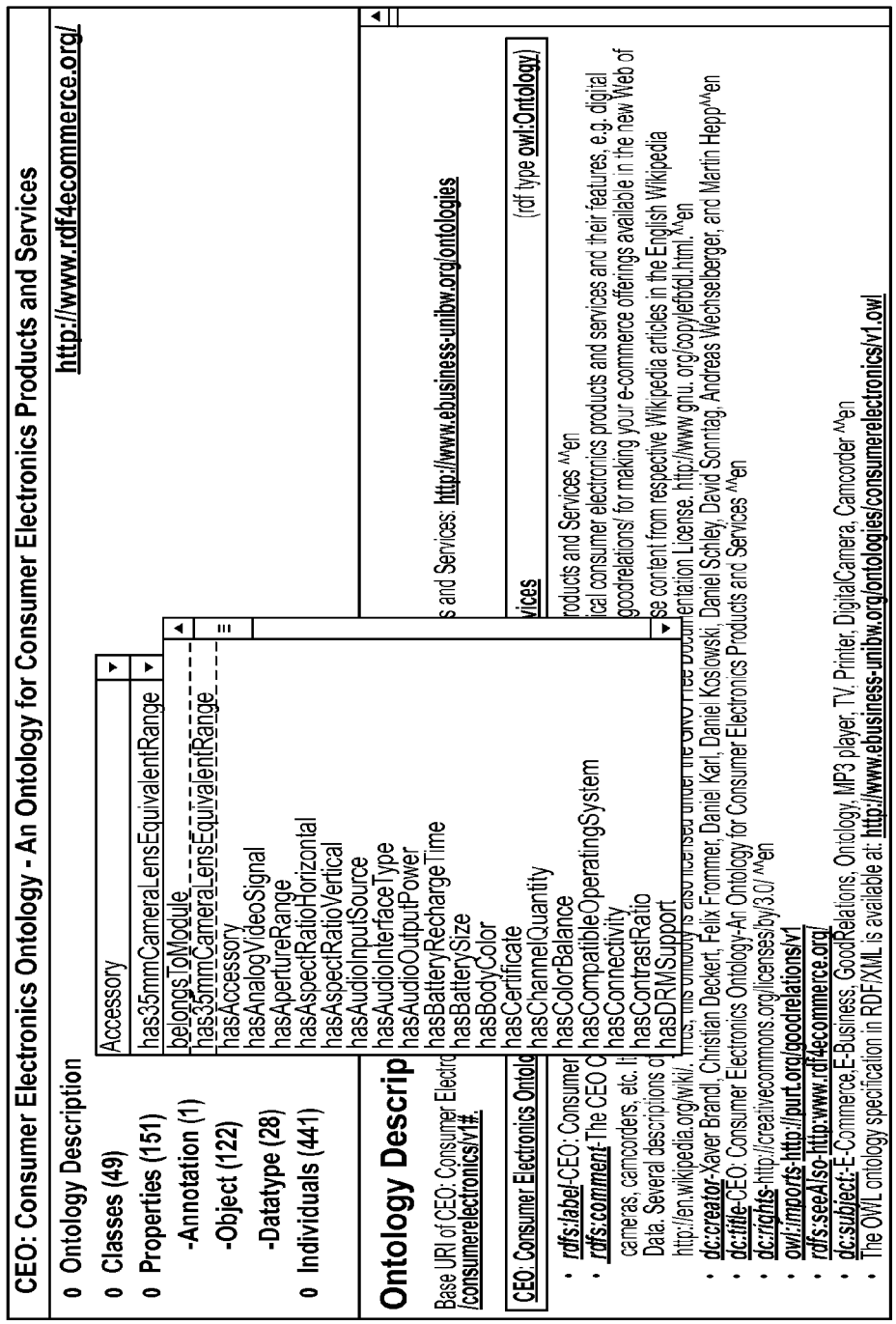
FIG. 6 shows a screenshot of an example encyclopedic knowledge-base (EKB) for Consumer Electronics Product and Services.

The campaign designer provides a set of entity instances for which they desire to render information about in the campaign documents. The set is automatically queried against an EKB by using standard semantic web programmatic query techniques (such as SPARQL) to return a list of attribute-value pairs of the entity instances. An attribute-value pair consists of the name of a property for that entity and the value of that property (for example, a query on the City entity of Oslo would include the attribute-value pair [populationMetro, 1403268]. The list of attribute-value pairs could be exhaustive across the entity by providing every available attribute-value pair, or could be limited to an attribute set provided by the campaign designer. In the latter case, the campaign designer may have selected the attribute set from the properties of the given ontology (see FIG. 6 related to the Electronics Store example below), or provided their own custom list of attributes which are subsequently automatically matched to the ontological properties with known lexical techniques such as synsets.

Figure 5:
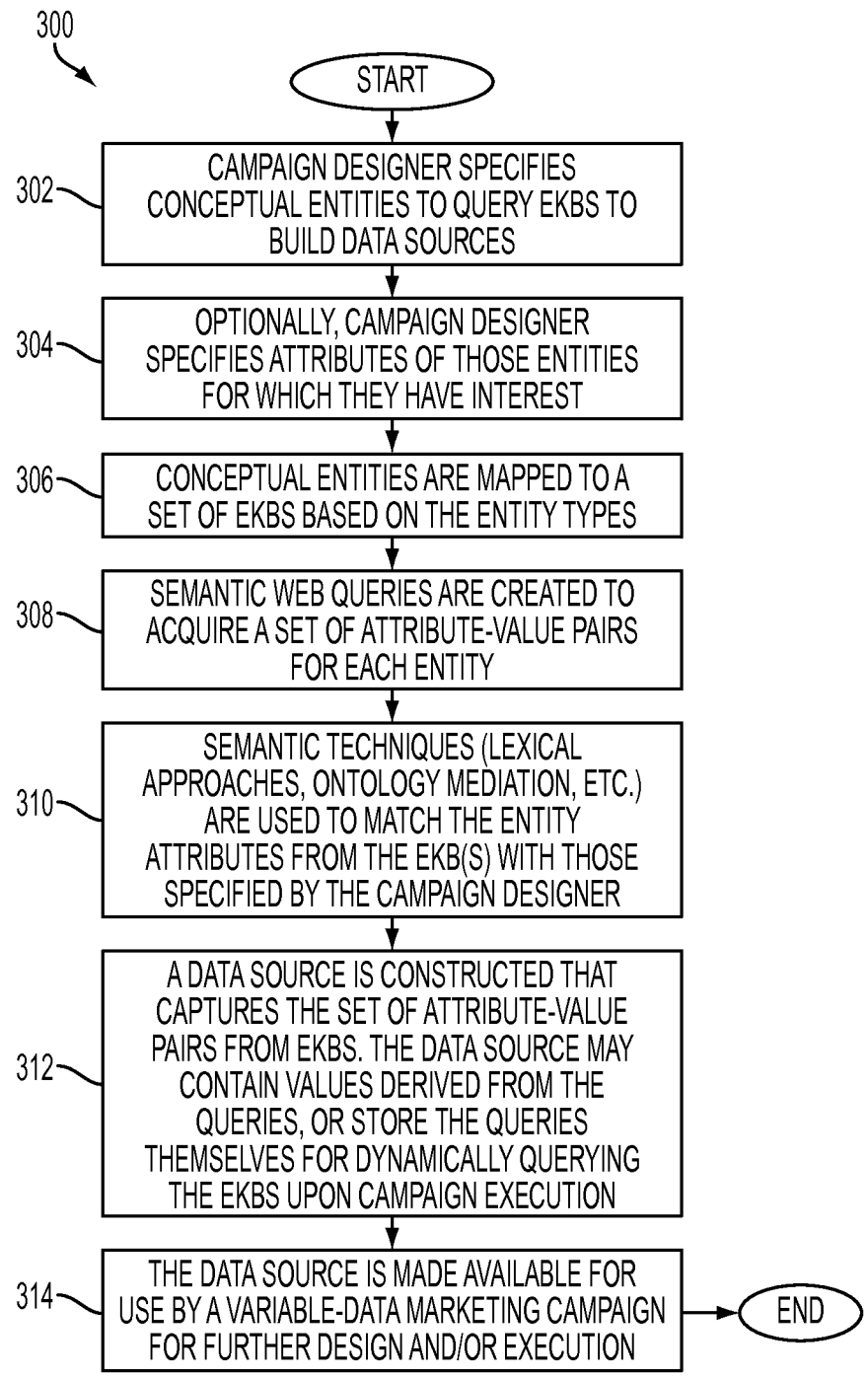
FIG. 5 is a flowchart of an exemplary method in accordance with the present disclosure.

Turning to FIG. 5, an exemplary method 300 in accordance with the disclosure is illustrated. At 302, a campaign designer specifies conceptual entities to query EKBs to build data sources. A conceptual entity for a VDP pattern includes the type of VDP element in which the campaign designer desires to vary one or more properties or attributes about that element on the VDP document. Optionally, at 304, the campaign designer specifies attributes of those entities for which they have interest.

At 306, the conceptual entities are mapped to a set of EKBs based on the entity types. At 308, semantic web queries are created to acquire a set of attribute-value pairs for each entity. Semantic techniques (lexical approaches, ontology mediation, etc.) are used to match the entity attributes from the EKB(s) with those specified by the campaign designer in process step 310. At 312, a data source is constructed that captures the set of attribute-value pairs from EKBs. The data source may contain values derived from the queries, or store the queries themselves for dynamically querying the EKBs upon campaign execution. To this end, the stored queries can be run periodically to update the data source. Finally, at 314, the data source is made available for use by a variable-data marketing campaign for further design and/or execution.

The method 300 is best understood with reference to the following examples:

EXAMPLE 1

An electronics store owner would like to run a campaign on Camcorder Products that will vary based on the Recipient's level of videography expertise. The camcorder offered to the customer will vary on the campaign documents based on whether their expressed expertise is none, low, medium, or high. The campaigner would like to render on each document the camera's capability for optical zoom, digital zoom, and weight, but the store owner does not have a Product data source that contains the desired data for the Camcorders he wants to offer.

The electronics store campaign designer expresses campaign intent to offer various Camcorders to his customers based on each Recipient's level of videography expertise. In the campaign intent, the campaign designer denotes the set of Camcorders he desires to offer in his Product Offer campaign, and would like to amend his product database to include the camcorder digital zoom, optical zoom, and weight properties, or other options such as those shown in FIG. 6. The semantic web query below is automatically constructed and submitted to an online public Linked Open Commerce dataspace at the SPARQL endpoint for example.

The following example query for 'optical zoom' is generated that makes use of the previously mentioned Consumer Electronics Ontology:

```
PREFIX gr: <http://purl.org/goodrelations/v1#>
PREFIX ceo: <http://www.ebusiness-unibw.org/ontologies/
    consumerelectronics/v1#>
PREFIX rdfs: <http://www.w3.org/2000/01/rdf-schema#>
SELECT ?m ?label ?zoomfactor (( ?weight / ?zoomfactor )) as
    ?weight_zoom_factor_ratio
WHERE
{
?m a ceo:Camcorder.
?m rdfs:label ?label.
?m ceo:hasOpticalZoomFactor ?z.
?z gr:hasValueInteger ?zoomfactor . fitter ( ?zoomfactor > 0 ) .
?v gr:hasValueFloat ?weight.
?v gr:hasUnitOfMeasurement "GRM" xsd:string.
}
ORDER BY DESC ( ?weight / ?zoomfactor )
```

Figure 7:
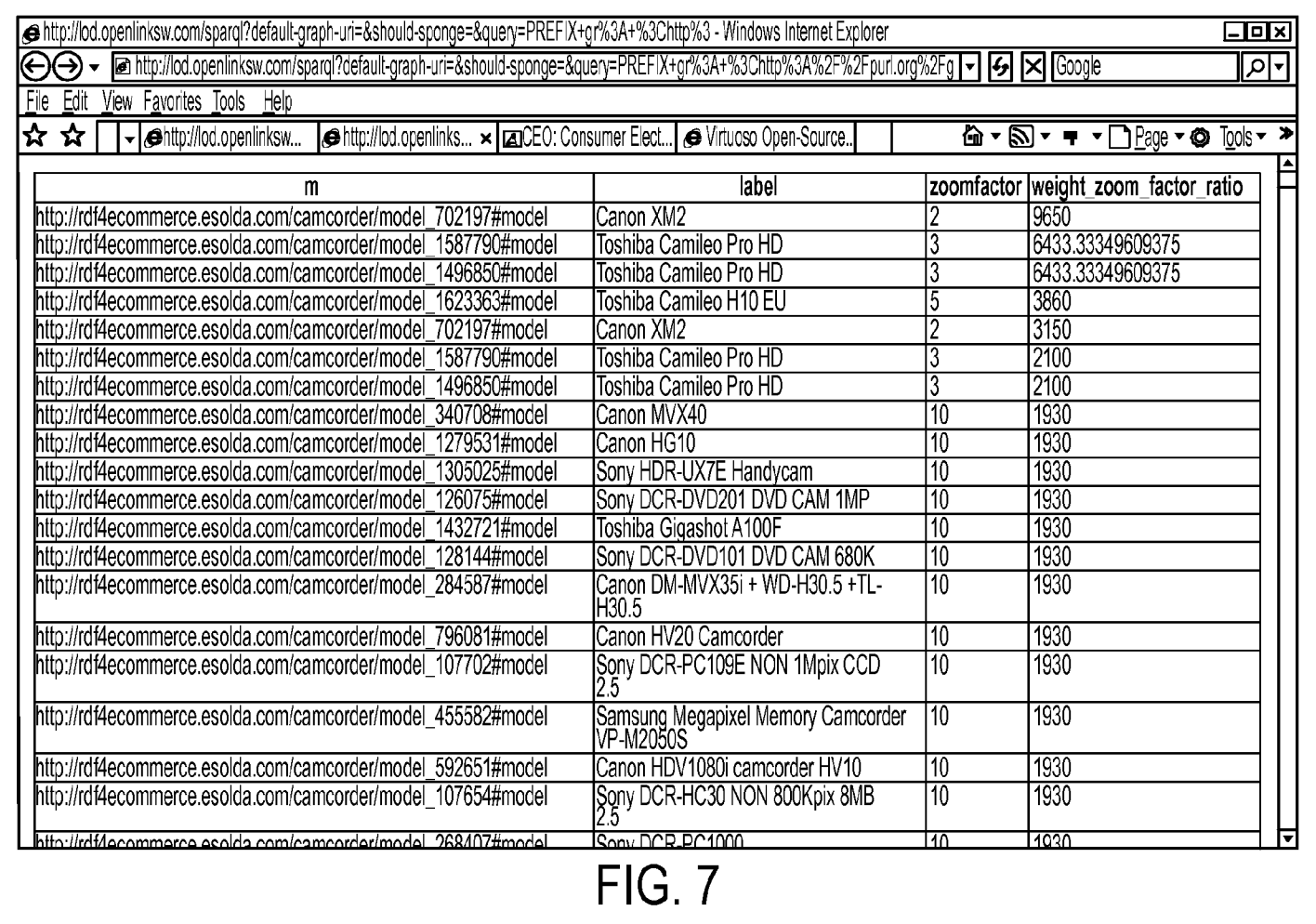

The query returns a set of attribute-value pairs shown in FIG. 7 for each Camcorder including its model, description and optical zoom factor. The campaign designer denotes that he wants the Camcorder optical zoom factor to render on the documents, such as with an application as described above, and in further detail in U.S. patent application Ser. No. 13/211,437 filed on Aug. 17, 2011, (Atty Docket No. 20100239-US-NP/XERZ 202535US01XERZ202535us01). The data source for Products is then amended automatically with data 'columns' for Product Optical Zoom Factor, and populated with the appropriate values for each Camcorder.

EXAMPLE 2

A pet store owner would like to offer discounts to her customers on pet products that suit that particular customer's pet preference. Whereas the product offered will vary on the dynamic document based on the customer's pet preference, the pet store owner does not have a product data source that contains all of the data they desire to render, such as a product description or product image.

The pet store campaign designer expresses campaign intent to offer various products to her customers based on each of the recipient's pet preference: cat, dog, hamster, or fish. In the campaign intent, the campaign designer denotes the set of products they desire to offer in their Product Offer campaign. The products are Iams Cat Food, Flexi Dog Leash, Habitrail Habitat, and BioCube Aquarium. Similar to the Camcorder example above, a semantic web query is automatically created and submitted to an online GoodRelations-annotated web endpoint or consumer products that cover this domain.

The query returns a set of attribute-value pairs for each product, such as the product's description, price, image, and customer rating. The campaign designer denotes that she wants the product description and the product image to render on the documents. A data source for products is then automatically created (or amended if provided by the campaign designer) with data 'columns' for Product Image and Product Description, and populated with the appropriate values for each Product.

EXAMPLE 3

A travel agency would like to promote Canadian skiing and snowboarding locations based on which province the customer lives in, but the promoter doesn't have a City data source on hand that contains information they would like to render about the locations such as monthly snowfall amounts, City's website, and population.

The travel agency campaign designer expresses campaign intent to promote tourism at Canadian skiing and snowboarding locations. In the campaign intent, the campaign designer denotes the locations they desire to promote such as Ottawa, Hamilton, Windsor, Winnipeg, etc. Each location is associated with a city for which the campaign designer wants to render information for each recipient. A semantic web query is automatically created and submitted to the online DBpedia EKB, for example:

```
SELECT ?property ?hasValue ?isValueOf
    WHERE {
        { <http://dbpedia.org/resource/Ottawa> ?property ?hasValue }
          UNION
        { ?isValueOf ?property <http://dbpedia.org/resource/Ottawa> }
    }
```

The query returns a set of attribute-value pairs for each city, such as the city's spoken languages, time zone, population, elevation, average snowfall for each month, flag image, website, etc. (see FIG. 8). The campaign designer denotes to use the city population, monthly snowfall averages, and website to render on the documents. A data source for Cities is then automatically created (or amended if previously provided by the campaign designer) with data 'columns' for City Population, City Average Snowfalls (for each month), and City Website, and populated with the appropriate value for each City.

The sets of attribute-value pairs for the entities can then be used in a VDP campaign in one of two ways:

1) The attribute-value pairs of particular interest to the campaign designer are stored into a data source for use by the VDP marketing campaign. The data source stores the values for each entity and related attributes in a format accessible to a campaign such as an Excel table (see FIG. 9). The data source is then packaged the campaign's VDP logic, graphic assets, and document template to produce the variable content in the dynamic document.

2) Alternatively, the campaign logic may support dynamically querying the EKB for current values upon execution of the campaign logic to produce the dynamic documents. The queries for acquiring the values from the EKB would be stored and used by the VDP campaign at execution time. This approach would also require an additional capability of the VDP campaign logic (e.g., XMPie plan file and uPlan application) and the VDP server (e.g., XMPie uProduce) to support this.

In addition to creating or amending data sources for an existing campaign, the techniques described herein could also be used to generate prototypical data for campaign sample documents, such as those created using the tool described above, and in more detail in U.S. patent application Ser. No. 13/050,021 filed on Mar. 17, 2011, which is hereby incorporated herein by reference in its entirety.

Further, the step of populating a data source using static information that was retrieved from an online EKB can, alternatively or in addition, be retained in a data source as multiple lookup queries which could be use to dynamically retrieve the most up-to-date data when the campaign data source is run against the campaign logic to produce the dynamic documents for the various recipients.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for creating data sources for a variable data publishing (VDP) marketing campaign pattern, comprising:
   receiving user input related to a conceptual entity specified by the user, the conceptual entity including information relating to a type of VDP element to be varied in at least two of a plurality of documents generated by the VDP marketing campaign pattern;
   determining a type of the conceptual entity;
   mapping the conceptual entity to at least one encyclopedic knowledge database based on the type of the conceptual entity;
   generating at least one semantic query based on the conceptual entity;
   querying the at least one encyclopedic knowledge database with the at least one semantic query; and
   generating a data source for use in a VDP marketing campaign containing values derived from the querying step, the data source including a set of attribute-value pairs received from the encyclopedic knowledge database;
   wherein the data source is used in the VDP marketing campaign to produce at least two documents having different VDP elements of the type corresponding to the conceptual entity.

2. The method according to claim 1, wherein receiving user input related to a conceptual entity includes presenting the user with a plurality of conceptual entities, and receiving an indication from the user regarding a selected conceptual entity.

3. The method according to claim 2, further comprising presenting the user with at least one VDP element comprising a natural language sentence having a plurality of selectable conceptual entities.

4. The method according to claim 3, further comprising receiving an indication that the user has selected at least one of the plurality of selectable conceptual entities.

5. The method according to claim 4, further comprising presenting the data source to the user for selection of at least one attribute-value pair for use in the VDP campaign.

6. The method according to claim 1, wherein the data source includes at least one of product information, geographical information, climate information, or business information.

7. The method according to claim 1, further comprising storing the at least one semantic query in a memory.

8. The method according to claim 7, further comprising querying the at least one encyclopedic knowledge database with the at least one semantic query stored in memory on a periodic basis to update the data source.

9. The method according to claim 1, further comprising generating a VDP marketing campaign using at least some information contained in the data source.

10. A processor configured to execute computer-executable instructions for performing the method of claim 1, the instructions being stored on a computer-readable medium.

11. A system that generates data sources for a variable data publishing (VDP) marketing campaign pattern, comprising:
   a graphical user interface (GUI) via which a user interacts with a campaign creation application that is persistently stored on a computer-readable medium; and
   a processor that executes the campaign creation application and is configured to:
   receive user input related to a conceptual entity specified by the user, the conceptual entity including information relating to a type of VDP element to be varied in at least two of a plurality of documents generated by the VDP marketing campaign pattern;
   determine a type of the conceptual entity;
   map the conceptual entity to at least one encyclopedic knowledge database based on the type of the conceptual entity;
   generate at least one semantic query based on the conceptual entity;
   query the at least one encyclopedic knowledge database with the at least one semantic query; and
   generate a data source for use in a VDP marketing campaign containing values derived from the querying step, the data source including a set of attribute-value pairs received from the encyclopedic knowledge database;
   wherein the data source is used in the VDP marketing campaign to produce at least two documents having different VDP elements of the type corresponding to the conceptual entity.

12. The system according to claim 11, wherein receiving user input related to a conceptual entity includes presenting the user with a plurality of conceptual entities, and receiving an indication from the user regarding a selected conceptual entity.

13. The system according to claim 12, wherein the processor is further configured to present the user with at least one VDP element comprising a natural language sentence having a plurality of selectable conceptual entities.

14. The system as set forth in claim 13, wherein the processor is further configured to receive an indication that the user has selected at least one of the plurality of selectable conceptual entities.

15. The system according to claim 14, wherein the processor is further configured to present the data source to the user for selection of at least one attribute-value pair for use in the VDP campaign.

16. The system as set forth in claim 11, wherein the data source includes at least one of product information, geographical information, climate information, or business information.

17. The system as set forth in claim 11, wherein the processor is further configured to store the at least one semantic query in a memory.

18. The system as set forth in claim 17, wherein the processor is further configured to query the at least one encyclopedic knowledge database with the at least one semantic query stored in memory on a periodic basis to update the data source.

19. The system as set forth in claim 11, wherein the processor is further configured to generate a VDP marketing campaign using at least some information contained in the data source.

20. A non-transitory computer-readable medium having persistently stored thereon computer-executable instructions for personalizing a variable data publishing (VDP) marketing campaign pattern, comprising instructions for:

receiving user input related to a conceptual entity specified by the user, the conceptual entity including information relating to a type of VDP element to be varied in at least two of a plurality of documents generated by the VDP marketing campaign pattern;

determining a type of the conceptual entity;

mapping the conceptual entity to at least one encyclopedic knowledge database based on the type of the conceptual entity;

generating at least one semantic query based on the conceptual entity;

querying the at least one encyclopedic knowledge database with the at least one semantic query; and generating a data source for use in a VDP marketing campaign containing values derived from the querying step, the data source including a set of attribute-value pairs received from the encyclopedic knowledge database;

wherein the data source is used in the VDP marketing campaign to produce at least two documents having different VDP elements of the type corresponding to the conceptual entity.

* * * * *